United States Patent [19]
Ahsan

[11] Patent Number: 5,119,324
[45] Date of Patent: Jun. 2, 1992

[54] APPARATUS AND METHOD FOR PERFORMING ARITHMETIC FUNCTIONS IN A COMPUTER SYSTEM

[75] Inventor: Agha Y. Ahsan, San Jose, Calif.

[73] Assignee: Stardent Computer, Concord, Mass.

[21] Appl. No.: 482,264

[22] Filed: Feb. 20, 1990

[51] Int. Cl.⁵ .............................................. G06F 7/38
[52] U.S. Cl. .................................................. 364/736
[58] Field of Search ...................... 364/736, 748, 754

[56] References Cited

U.S. PATENT DOCUMENTS

| | | | |
|---|---|---|---|
| 4,774,686 | 9/1988 | McClary et al. | 364/736 |
| 4,777,593 | 9/1988 | Yoshida | 364/736 |
| 4,779,192 | 9/1988 | Torii et al. | 364/736 |
| 4,811,268 | 3/1989 | Nishitani et al. | 364/745 |
| 4,841,467 | 6/1989 | Ho et al. | 364/748 |
| 4,852,037 | 7/1989 | Aoki | 364/736 |
| 4,958,312 | 9/1990 | Ang et al. | 364/736 |

Primary Examiner—Tan V. Mai
Attorney, Agent, or Firm—Blakeley, Sokoloff, Taylor & Zafman

[57] ABSTRACT

A computer having a processing unit with improved performance characteristics. The computer includes a floating point multiplier, a floating point arithmetic logic unit (ALU), a first clock generator for generating a first clock and a second clock generator for generating a second clock. The second clock is generated to have a fixed relationship with the first clock. Specifically, the first clock is delayed and inverted to produce the second clock. The multiplier includes an output port operating under control of the second clock and coupled to provide data to a first input port of the adder. The adder includes both the first input port and a second input port, both operating under control of the second clock. A first and second input port of the multiplier and an output port of the adder operate under control of the first clock. The described configuration allows operation with reduced latency.

23 Claims, 13 Drawing Sheets

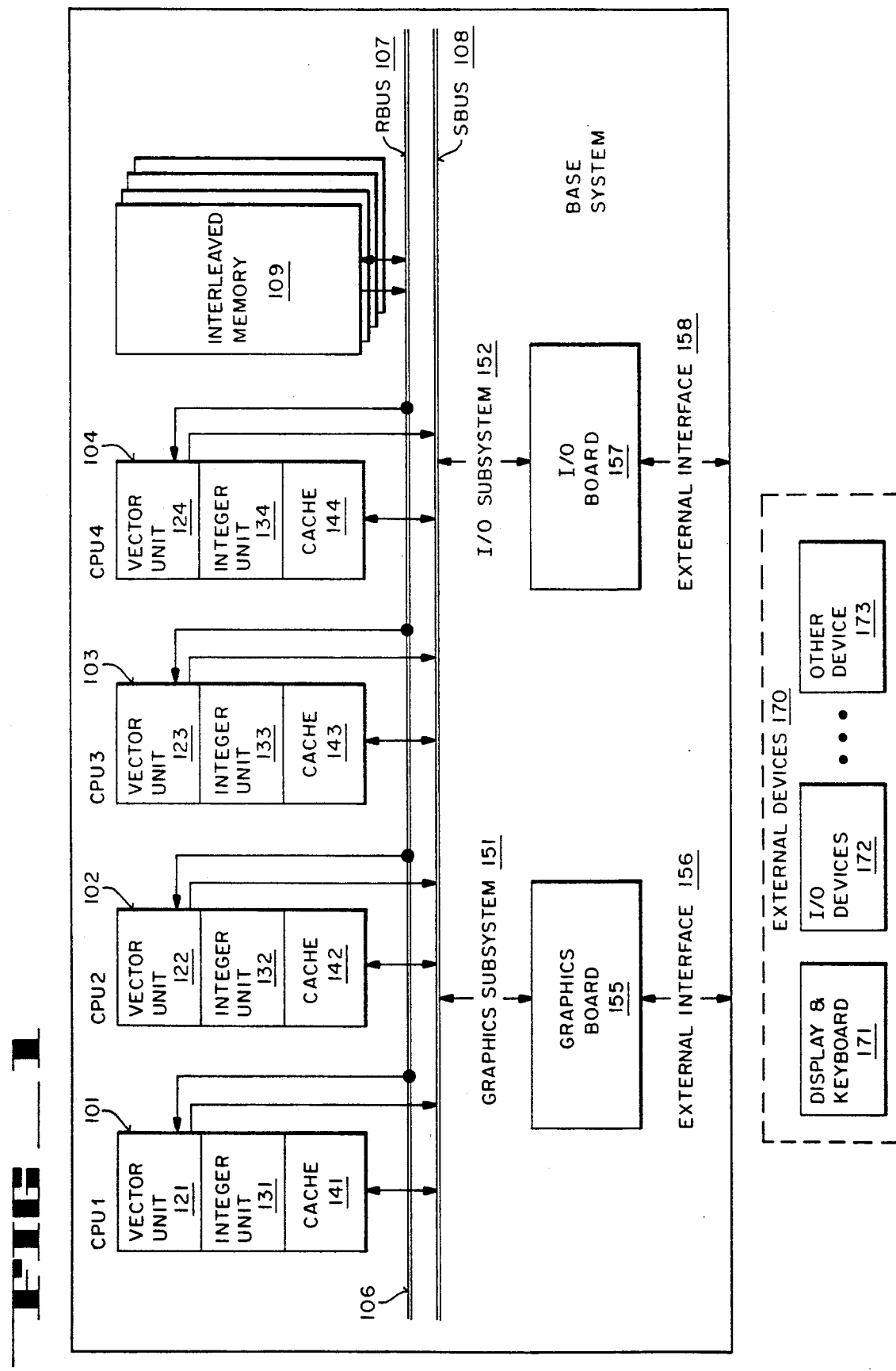
FIG._1

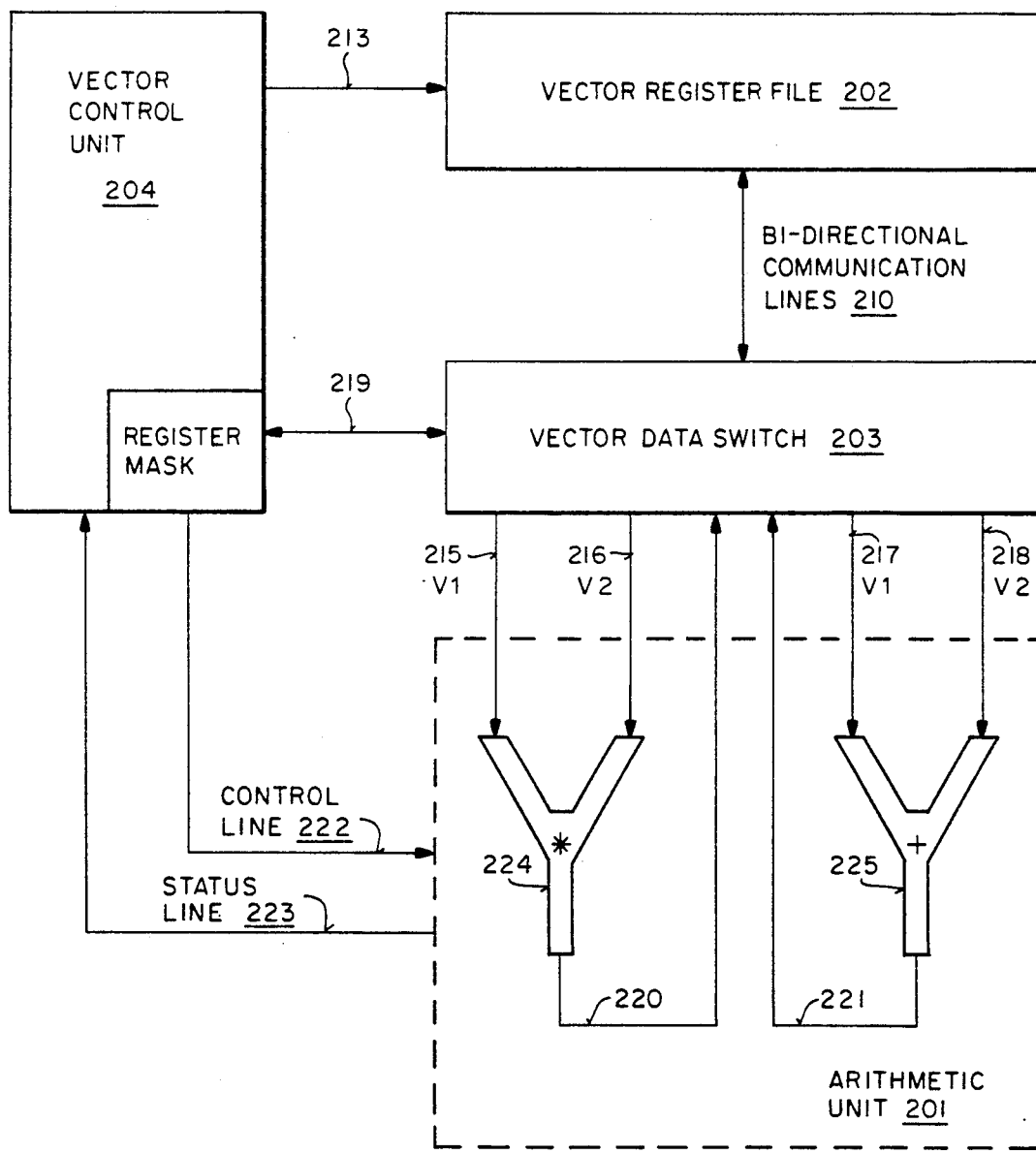
FIG_2 (PRIOR ART)

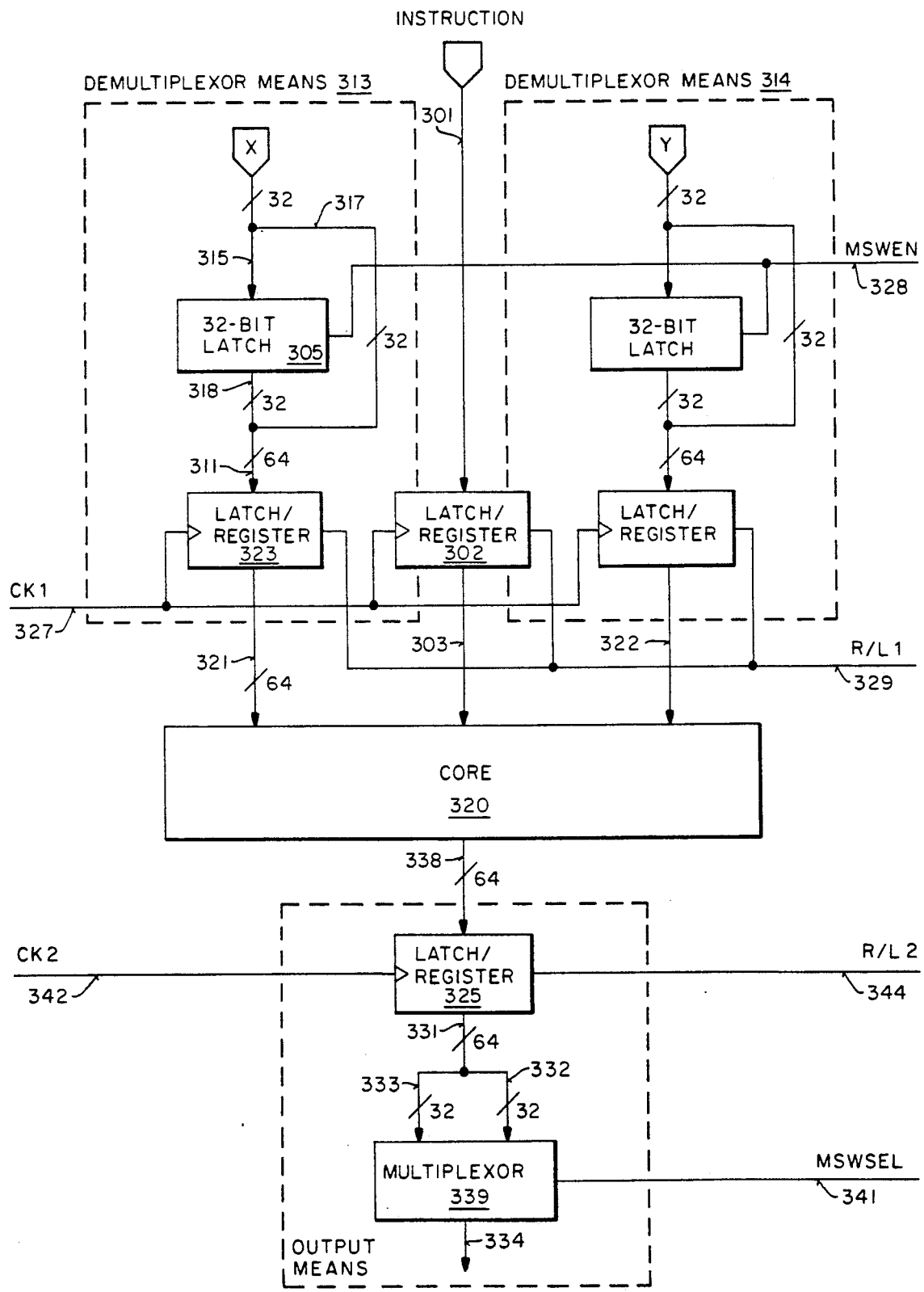

FIG _ 4
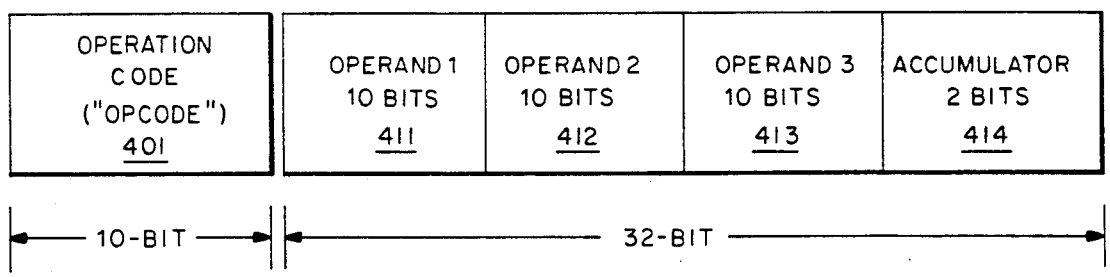

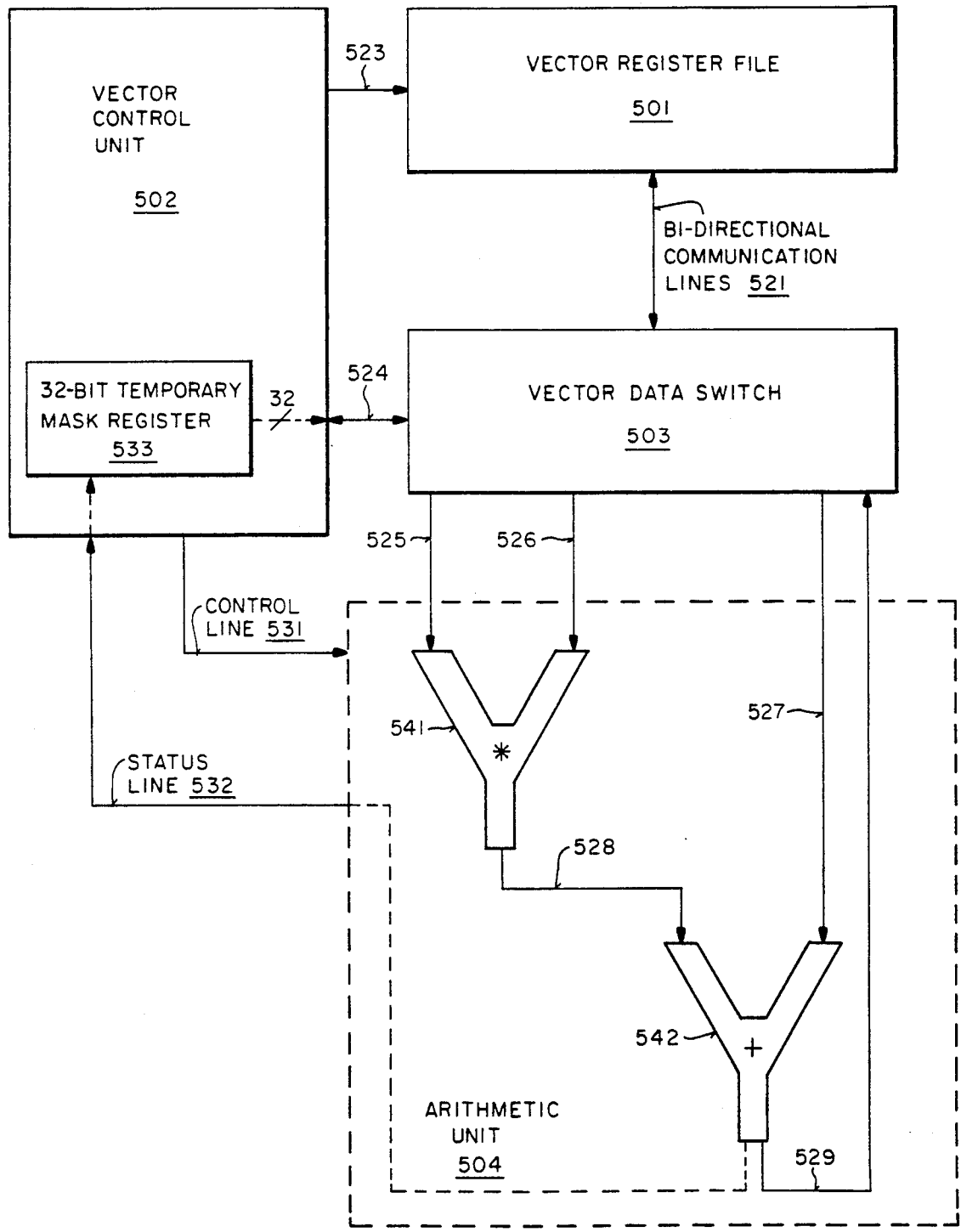
FIG_5

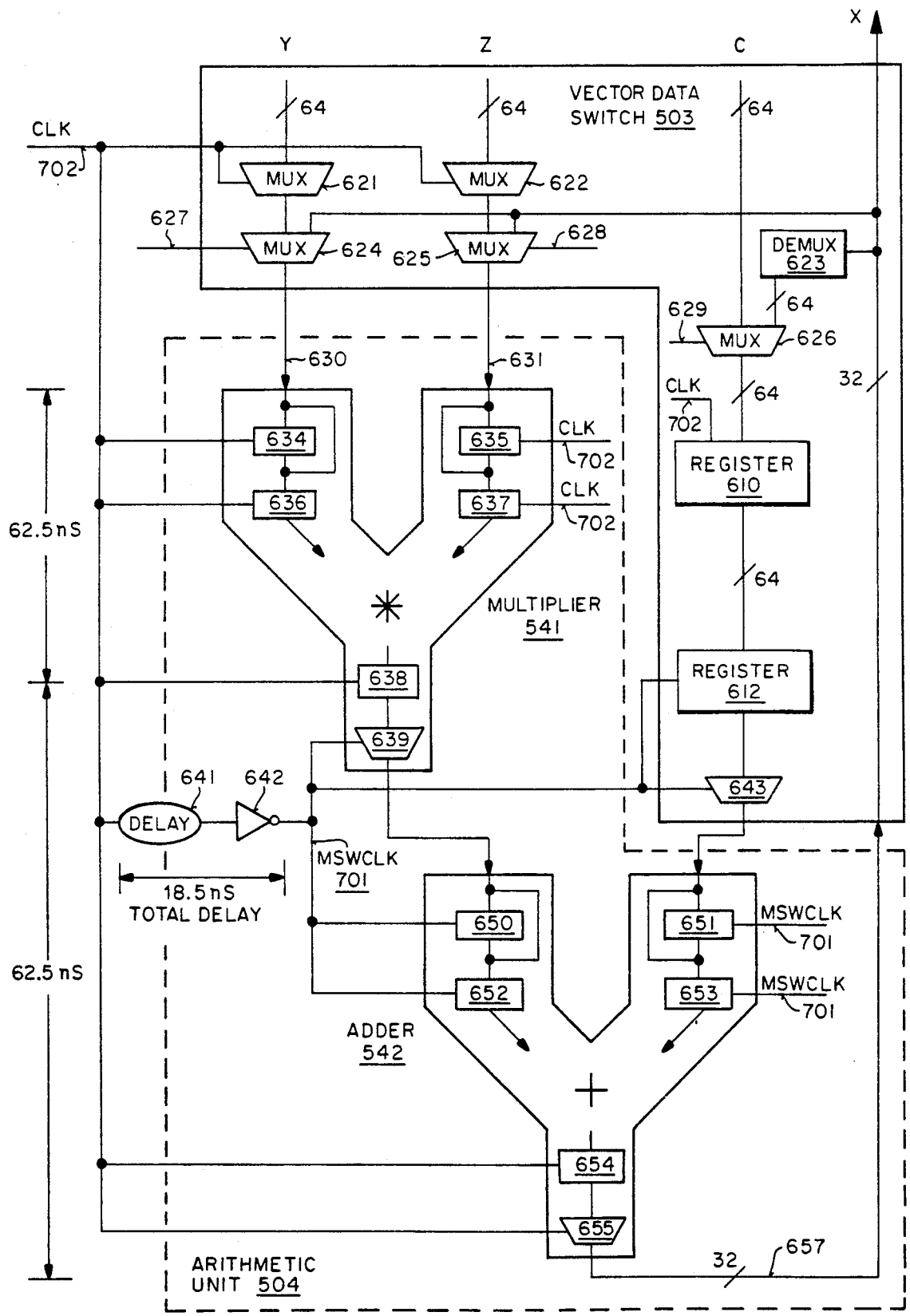
FIG_6

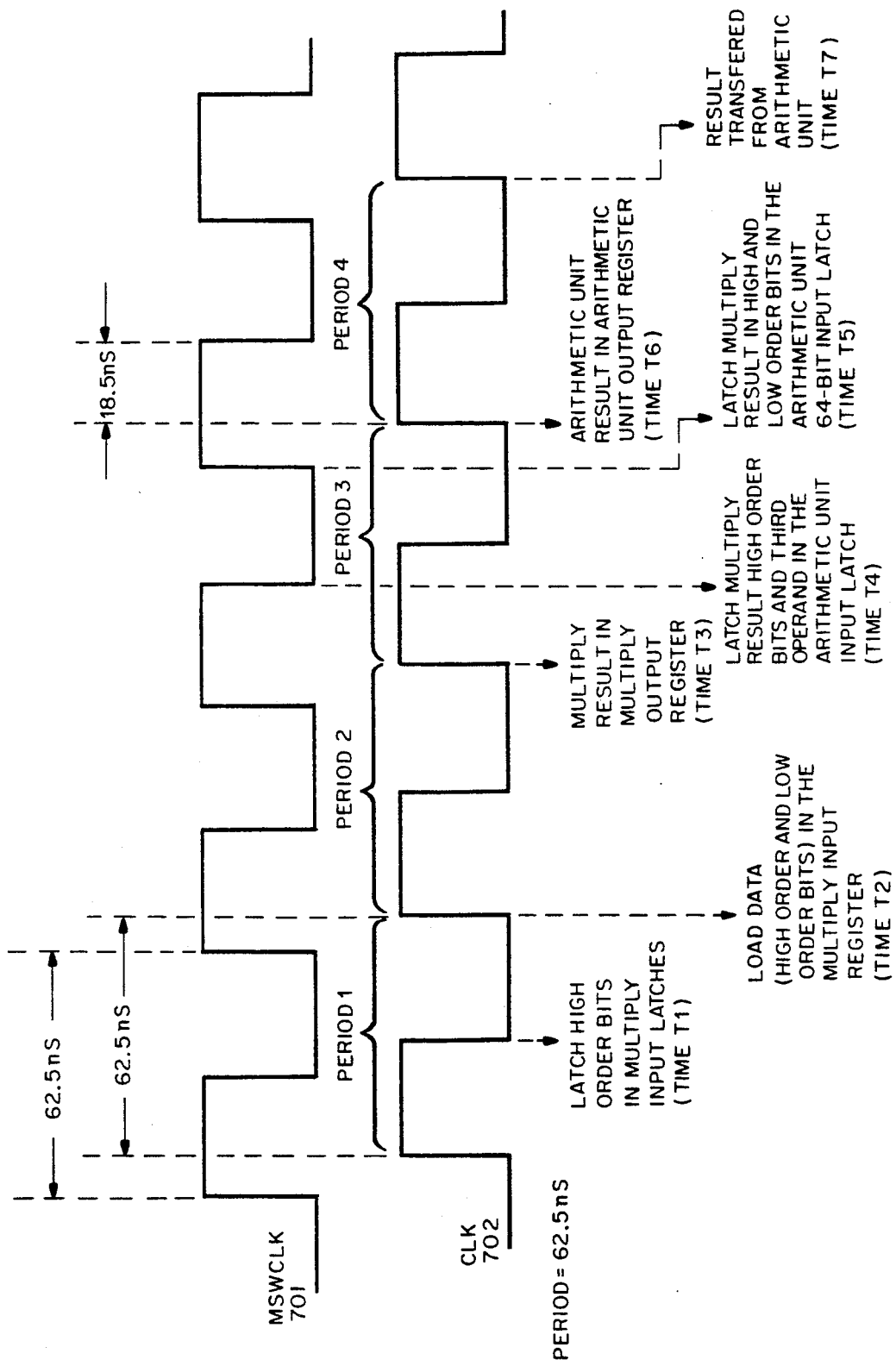

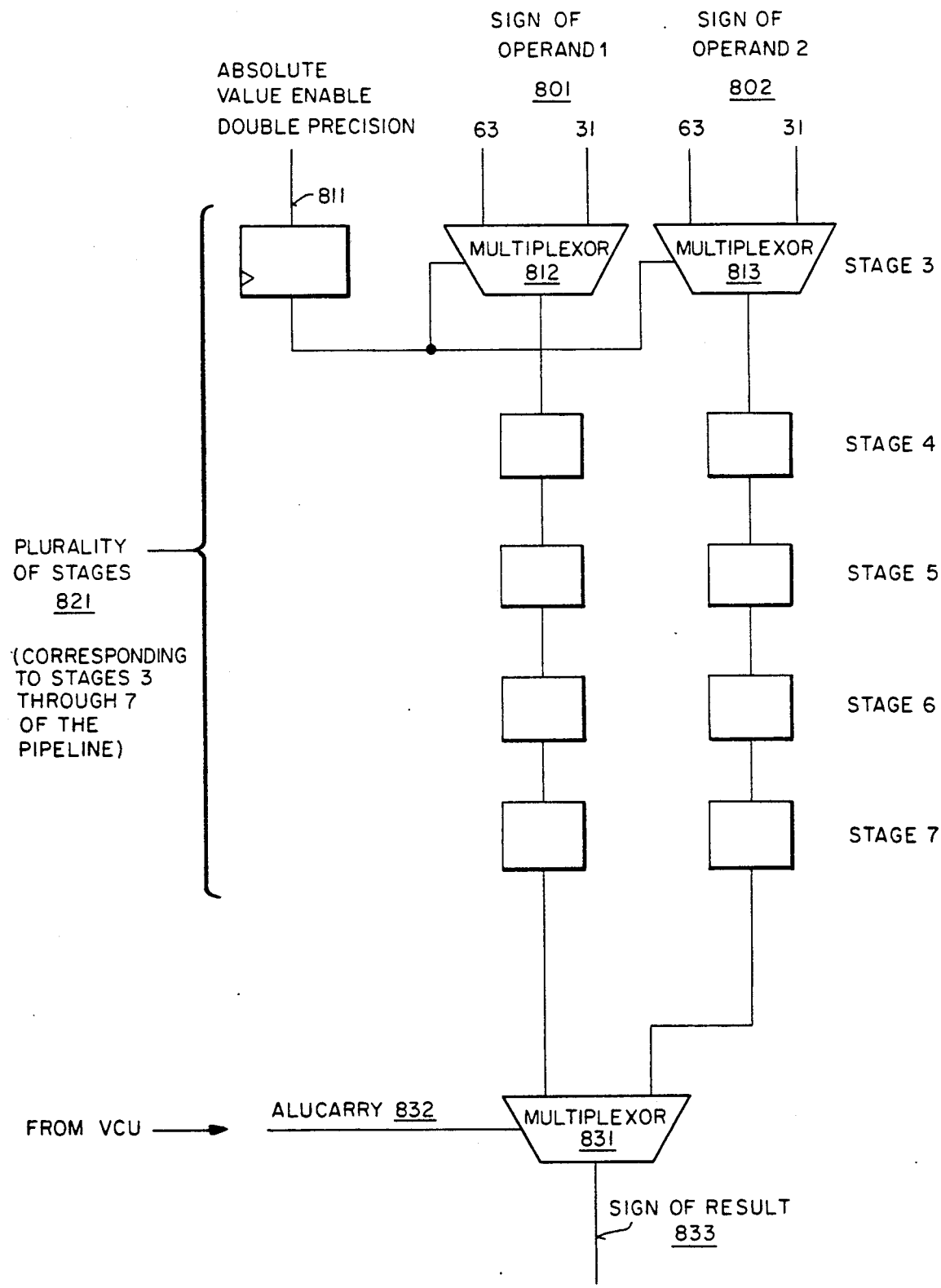
FIG_8

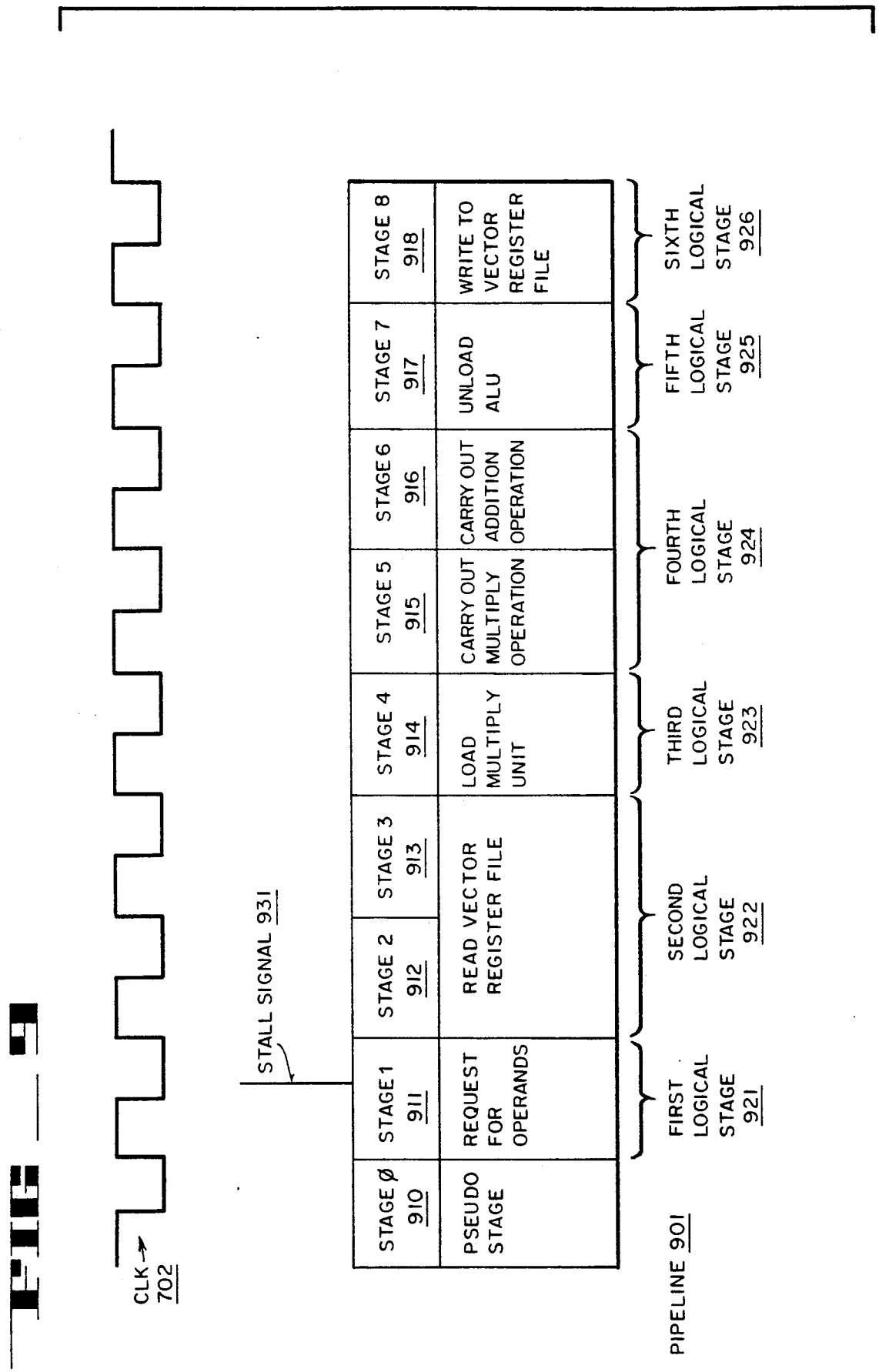

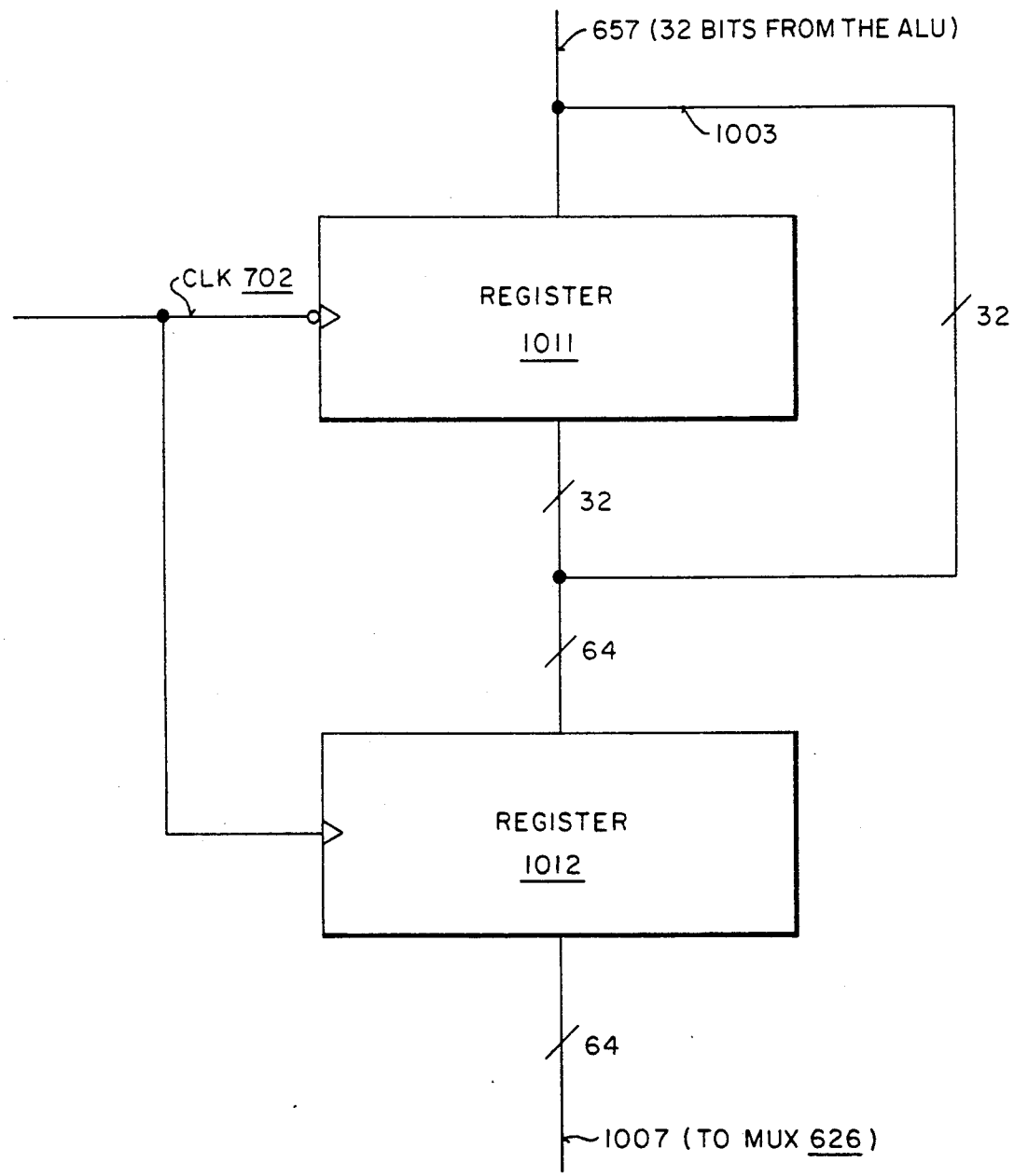

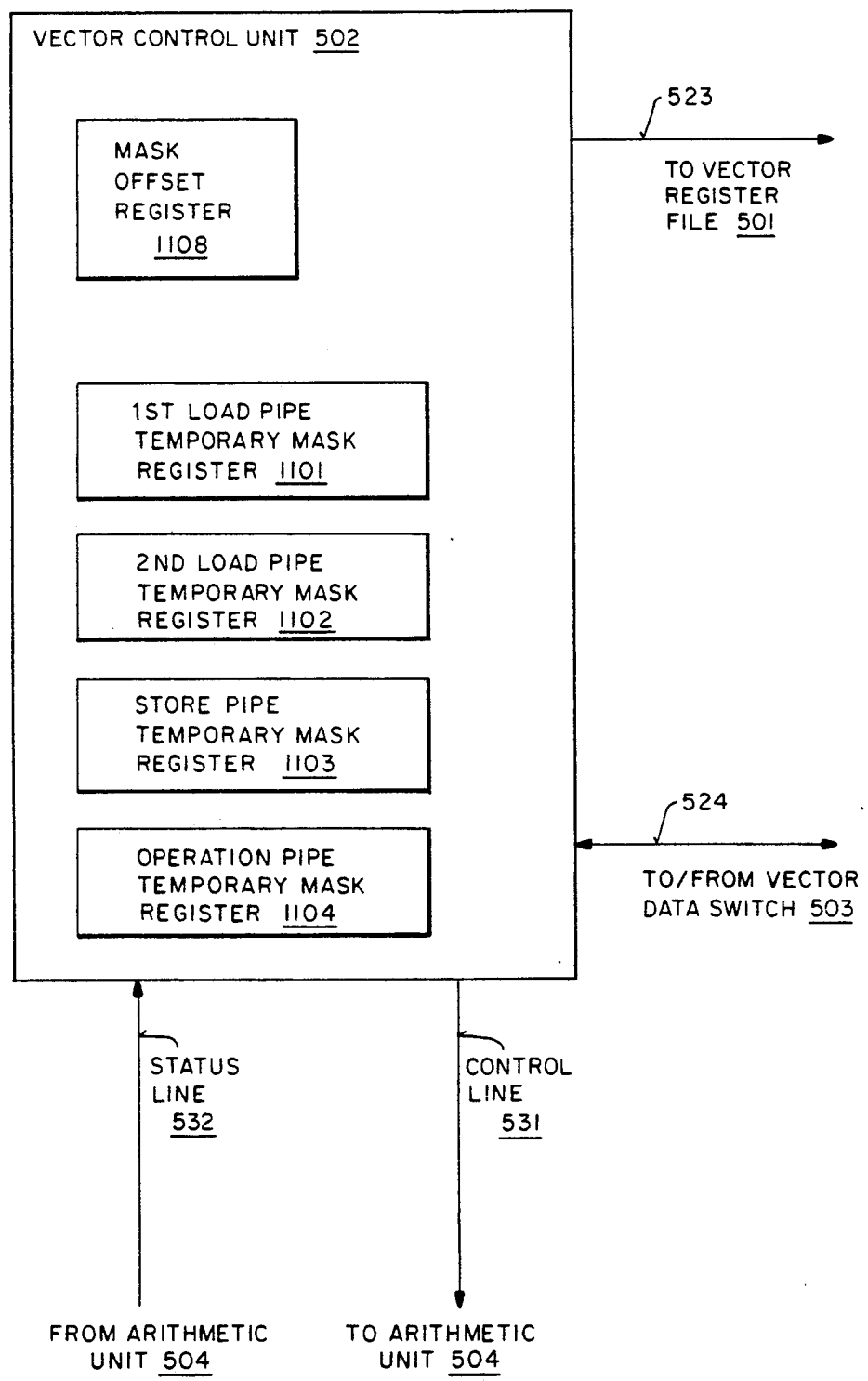
FIG _11

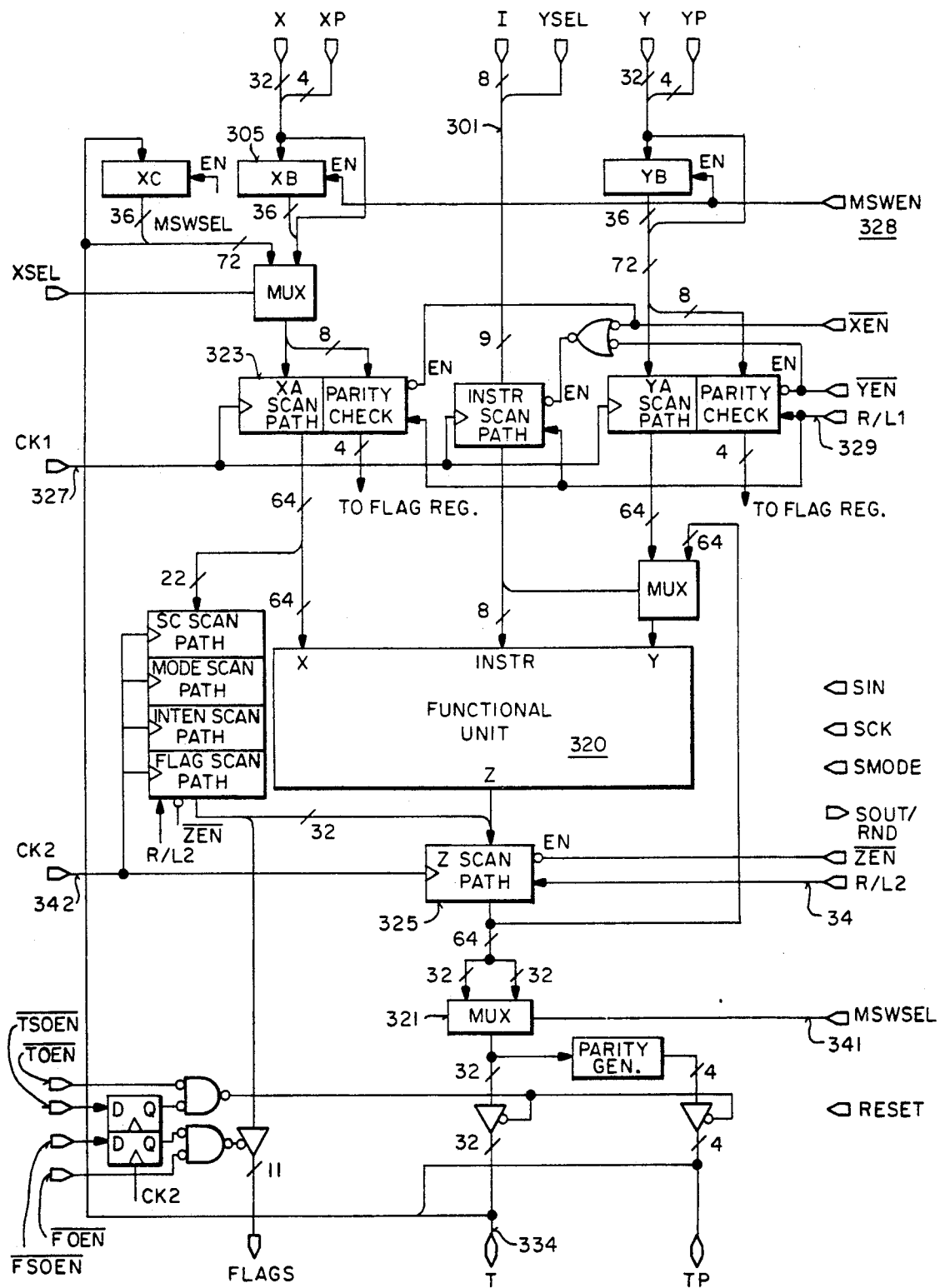
FIG _12

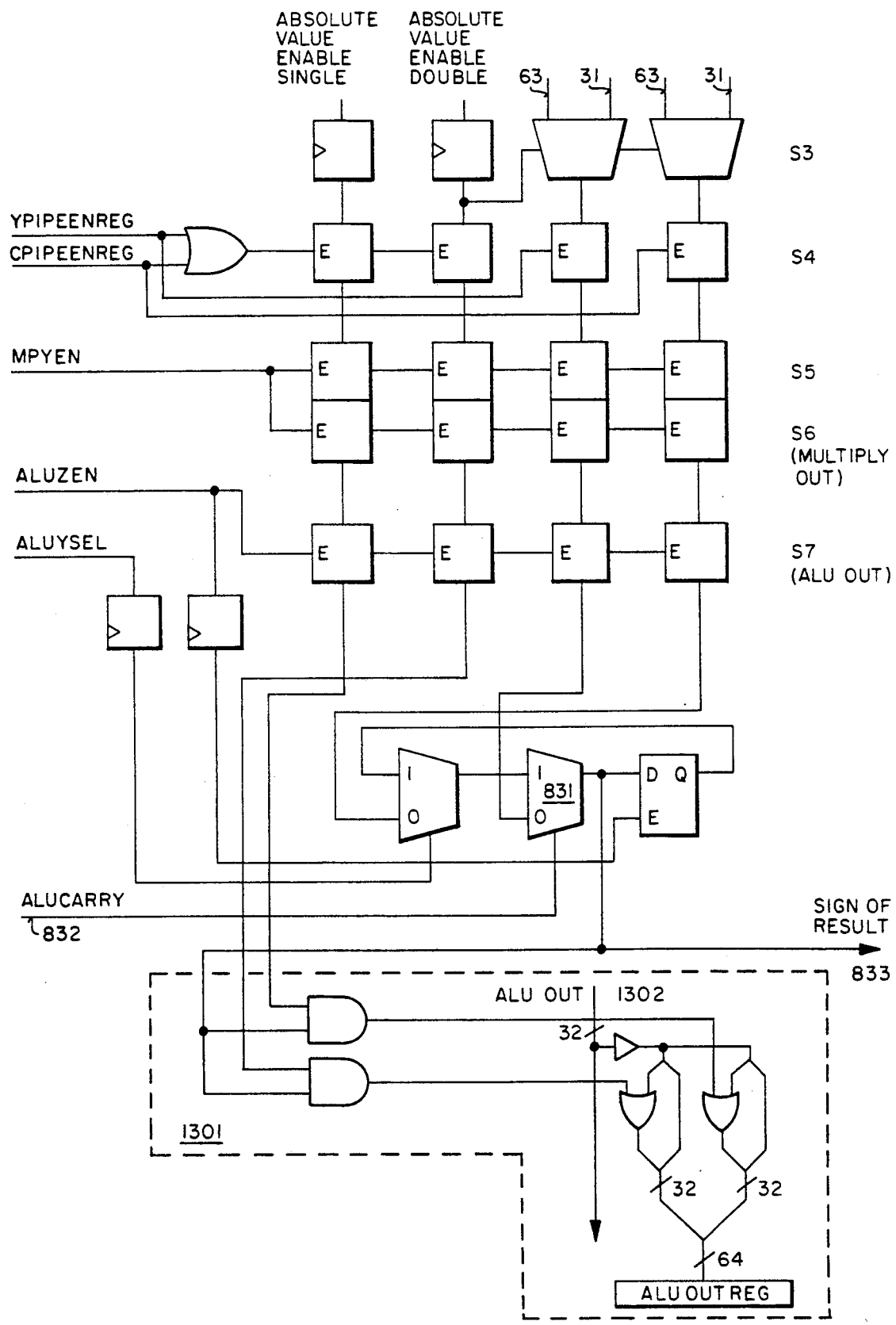
FIG_13

APPARATUS AND METHOD FOR PERFORMING ARITHMETIC FUNCTIONS IN A COMPUTER SYSTEM

BACKGROUND OF THE INVENTION

1. Field of the Invention

The present invention relates to the field of vector processing computer systems; more specifically, the present invention relates to apparatus for and methods of performing arithmetic operations on vectors in a vector processing computer.

2. Prior Art

A number of vector processing systems are known in the applicable art. In general, these systems provide an arithmetic unit which is capable of receiving at least a first vector as a first operand and a second vector as a second operand. The arithmetic unit provides as an output a third vector.

In at least one prior art system, capability is provided for allowing input of a first vector as a first operand, a second vector as a second operand, and a constant as a third operand. For example, the following equation is of this type of format:

$$X = Y op_1 Z op_2 C$$

Where, C is a constant, $op_1$ and $op_2$ are operations (such as multiply, add, etc.) and X, Y and Z are vectors. Such a system is commercially available as the STARDENT 1500 computer system from Stardent Computer, Inc. of Newton, Mass (formerly known as the TITAN Computer available from Ardent Computer of Sunnyvale, Calif.).

A block diagram of a circuit embodied in the STARDENT 1500 computer is shown as FIG. 2—this circuit will be discussed in more detail below in the Detailed Description of the present invention. However, it is worthwhile noting here that, as one aspect of the present invention, it is desired to develop a computer system having an arithmetic unit capable of accepting and executing an instruction which operates on as many as three vector operands. Further, it is an objective of the present invention to develop such a computer while providing compatibility with the prior art STARDENT 1500 computer.

Further, computers such as the STARDENT 1500 computer are capable of processing two vectors, such as vector V1 and V2 and comparing, on an element-by-element basis, the elements of these vectors V1 and V2. An output "mask" vector is provided which may indicate, for each vector element in V1 and V2, whether the element in V1 is greater than the element in V2, whether the element in V1 is equal to the element in V2, etc. This type of operation is useful, for example, where it is desired to add elements of vector V1 to elements of vector V2 only where the element of vector V1 is greater than the element of vector V2. The result of this addition operation might be stored in vector V3, elements of vector V3 only being affected when the corresponding element of V1 is greater than the corresponding element in V2. Shown algebraically:

$$mask = V1 > V2$$

$$V3 = V1 + V2 : mask \text{ true}$$

In the STARDENT 1500 computer, mask information is stored in a register which is an integral part of a vector control unit. The mask register of the STARDENT 1500 will be discussed in greater detail below with the discussion of FIG. 2.

It is recognized by the present invention that use of register in the vector control unit for storing masks leads to several disadvantages. It is an objective of the present invention to provide for more advantageous storage of mask information. For example, it has been recognized that the requirement of providing an available register on the vector unit leads to use of valuable real estate (space) on the vector control unit. Further, unless additional real estate is used, only one register is available. Therefore, it is not possible to easily and directly execute an instruction sequence such as:

$$mask_1 = V1 > V2$$

$$mask_2 = V1 > V3$$

$$mask_1 + mask_2 = mask_3$$

It is desired to provide a computer system unit with capability for allowing operations such as shown in the above example and in general to provide a system which allows for operation on and storage of a plurality of masks.

Further, in the prior art STARDENT 1500 computer, circuitry is provided to allow comparisons of the absolute value of elements in two vectors. The result of this operation is provided as a third vector. In the prior art STARDENT 1500, the values in the third vector are stored with sign information. In the preferred embodiment of the present invention, there exists circuitry to carry out compare operations on the absolute values of elements in vectors in which sign information is not preserved. To allow for compatibility with the prior art STARDENT 1500 computer and to provide similar functionality, it is desired to develop circuitry for saving sign information in the result vector when carrying out such compare operations on the absolute values of vector elements.

As yet another objective of the present invention it is desired to provide an arithmetic unit having relatively low latency, e.g., period of time from supplying operands to the arithmetic unit to receiving a result from the arithmetic unit.

These and other objectives of the present invention will be understood in more detail with reference to the Detailed Description of the Present Invention and the accompanying figures.

SUMMARY OF THE INVENTION

A vector processing computer system having at least one processor unit, a memory, an input/output means for connecting at least one peripheral device and a communication means for communicating information between the processor, memory and input/output means is described wherein the processor unit comprises a vector unit having a floating point multiplier and a floating point ALU ("adder").

The computer includes means for generating a first clock signal and means for generating a second clock signal where the second clock signal has a fixed relationship with the first clock signal. The second clock signal controls an output of the multiplier and the output of the multiplier is coupled to a first input of the adder. The second clock signal also controls the first input of the adder and a second input of the adder. A first and second input of the multiplier and an output of the adder are controlled by the first clock signal.

The adder in the preferred embodiment has a faster core processing speed than the multiplier. Specifically, in the preferred embodiment, the adder has a 25 nanosecond core and the multiplier has a 60 nanosecond core. As one aspect of the present invention, the adder and multiplier are coupled to allow loading of the multiplier with a first and second operand in a first clock cycle of the first clock; performing a first operation in the multiplier core on the first and second operand in a second clock cycle of the first clock; loading the result of the first operation and a third operand in the adder and performing a second operation in the adder in a third clock cycle of the first clock; and unloading the result from the adder in a fourth clock cycle of the first clock.

Further, the present invention describes a method and apparatus for allowing certain pairs of multiply and ALU class instructions to be executed in compound operations without requirement for storing an intermediate result of the first operation. Circuitry is provided to allow an output of a first instruction to be directly chained through a vector data switch as an input of a second instruction.

The present invention further describes an apparatus for allowing storage of mask registers in a vector register file allowing increased flexibility and use of mask registers in operation of the computer system of the present invention.

Further, the present invention discloses circuitry for preserving sign information of operands during specified absolute value comparison operations.

BRIEF DESCRIPTION OF THE DRAWINGS

FIG. 1 is a block diagram illustrating an overall block diagram of the computer system of the present invention.

FIG. 2 is a block diagram illustrating a prior art vector unit.

FIG. 3 is a block diagram illustrating a processing unit, such as a multiplication unit or addition unit, as may be utilized by the present invention.

FIG. 4 is an illustration of an operation code and operand format as may be utilized by the present invention.

FIG. 5 is a block diagram illustrating a vector unit as may be utilized by the present invention.

FIG. 6 is a block diagram further illustrating components of the vector unit of the present invention; specifically, a vector data switch and arithmetic unit as utilized by the present invention are illustrated.

FIG. 7 is a timing diagram illustrating certain timing features of the vector data switch and arithmetic unit of the present invention.

FIG. 8 is a block diagram further illustrating certain features of the vector unit of the present invention; specifically, circuitry for preservation of signs is illustrated.

FIG. 9 illustrates a pipeline process of the system of the present invention in relation to clock signal CLK shown in FIG. 7.

FIG. 10 illustrates a block diagram of a demultiplexor as may be utilized by the present invention.

FIG. 11 illustrates a block diagram of a vector control unit as may be utilized by the present invention.

FIG. 12 illustrates a block diagram of a floating point processor as may be utilized by the present invention.

FIG. 13 is a diagram further illustrating circuitry for preservation of sign information as may be utilized by the present invention.

DETAILED DESCRIPTION OF THE PREFERRED EMBODIMENT

A computer system including an arithmetic unit for operating on vectors is described. In the following description, numerous specific details are set forth such as specific circuits, instruction sequences, instruction formats, etc., in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

OVERVIEW OF THE COMPUTER SYSTEM OF THE PRESENT INVENTION

Referring first to FIG. 1, an overview of the computer system of the present invention is shown in block diagram form. It will be understood that while FIG. 1 is useful for providing an overall description of the computer system of the present invention, a number of details of the system are not shown. As necessary for disclosure of the present invention, further detail is set forth with reference to the other figures provided with this specification. Further, the present invention is described with reference to its preferred embodiment; alternative embodiments which may be conceived by one of ordinary skill in the art are considered within the scope of the claims set forth below.

The computer system of the preferred embodiment may be described as a multiprocessor vector processing system. In one embodiment, up to four central processing units, CPU 1 101, CPU 2 102, CPU 3 103 and CPU 4 104 are all coupled to a common bus 106. The bus comprises two portions labeled as RBUS 107 and SBUS 108. RBUS 107 is utilized in the present invention exclusively for vector read traffic (thus, the name RBUS). SBUS 108 is utilized for all other transactions including vector writes and accesses by integer processors 131-134, the graphics subsystem 151 and the I/O subsystem 152.

Each CPU comprises a vector unit (such as vector units 121, 122, 123 and 124 corresponding to CPU's 1-4, respectively) for performing vector operations; an integer unit (such as integer units 131, 132, 133 and 134 corresponding to CPU's 1-4, respectively); and cache memory (such as cache memory 141, 142, 143 and 144, respectively). As will be discussed in greater detail below, each vector unit 121-124 comprises elements such as a vector register file, a vector control unit, a vector data switch and an arithmetic unit.

The system further comprises interleaved memory 109 coupled with the bus 106. The interleaved memory 109 is coupled to both the RBUS 107 for providing vector data from the memory 109 and to the SBUS 108 for all other memory accesses. Access to memory 109 is shared by the CPU's 1-4, the graphics subsystem 151 and the I/O subsystem 152.

The graphics subsystem 151 includes a graphics board 155 for interface to an external device through external interface 156. In the preferred embodiment at least one additional expansion graphics board may be provided (not shown). As stated above, the graphics board may interface with one or more external devices 170.

The I/O subsystem 152 includes I/O board 157 which provides, for example, SCSI channels, keyboard interface, networking interface, RS-232 interface, audio interface, cursor control interface, etc. The I/O board 157 is coupled through external interface 158 to one or more of external devices 170.

External devices 170 includes such devices as a display and keyboard 171, I/O devices 172 (tape drives, disk drives, etc.) and other devices 173 (printers, cursor control devices, etc.).

DESCRIPTION OF A PRIOR ART VECTOR PROCESSING UNIT

Referring now to FIG. 2, a portion of a prior art vector unit (as utilized in the prior art STARDENT 1500 computer) is shown in block diagram form. The vector unit is illustrated as including an arithmetic unit 201, a vector register file 202, a vector data switch 203 and a vector control unit 204. In this prior art vector processing unit, the vector register file 202 is coupled to both provide to and accept from the vector data switch 203 on bi-directional communication lines 210. In the prior art STARDENT 1500 computer, elements of up to four vectors may be transferred on bi-directional lines 210 per clock cycle. It may be noted that in the preferred embodiment of the present invention up to eight vector elements may be transferred per clock cycle. The vector register file 202 is further coupled to receive information from vector control unit 204 on unidirectional line 213.

Vector data switch 203, in addition to being coupled to provide and accept vectors on bi-directional communication lines 210, is coupled to provide vector V1 to the arithmetic unit 201 on lines 215 and 217 and to provide vector V2 to the arithmetic unit on lines 216 and 218. Vector data switch 203 is further coupled to receive results of multiplication operations of the arithmetic unit 201 on line 220 and to receive results of addition operations on line 221. Finally, vector data switch 203 is coupled to receive from and provide to vector control unit 204 information on line 219.

Arithmetic unit 201 comprises a multiplication unit 224 coupled for receiving vector V1 on line 215 and vector V2 on line 216 and for providing a result on line 220. The arithmetic unit further comprises an addition unit 225 coupled for receiving vector V1 on line 217 and vector V2 on line 218 and for providing an output result on line 221. Further, the arithmetic unit 201 receives control information from vector control unit 204 on line 222 and provides status information to vector control unit 204 on line 223.

As can be observed with reference to FIG. 2, in the case of an operation such as:

$$X = Y*Z + C$$

vectors Y and Z must first be supplied on lines 215 and 216 from the vector data switch 203 to multiplier 224. The result of the multiplication is supplied from the multiplier 224 back to the data switch on line 220. This result and the constant C can then be supplied on lines 217 and 218 to addition unit 225 and the final result Z is supplied from the addition unit 225 back to the vector data switch 203 on line 221. As will be seen with specific reference to FIG. 5, the present invention provides a configuration for coupling of the vector data switch, multiplication unit and addition unit which offers performance and other advantages over the above described coupling of said elements utilized by the prior art STARDENT 1500 Computer.

DESCRIPTION OF THE MULTIPLICATION AND ADDITION UNITS OF THE PREFERRED EMBODIMENT

The preferred embodiment of the present invention provides an advantageous design for computer systems using multiplication and addition units embodying a design such as used by such units manufactured by Bipolar Integrated Technology, Inc. (hereinafter referred to collectively as "BIT" chips). The multiplication unit utilized by the preferred embodiment is available from Bipolar Integrated Technology, Inc. under part number B3110/B2110 and the addition unit is available under part number B3120/B2120.

Referring now to FIG. 3, a block diagram illustrating certain circuitry embodied in the BIT chips utilized by the preferred embodiment is illustrated. It should be noted that the following description applies generally to the operation of BIT chips. A more detailed description of the preferred embodiment of the present invention utilizing the described circuitry is made with reference to FIGS. 6 and 7.

The BIT chips comprise a core 320 comprising circuitry for accomplishing the function(s) of the specific chip (e.g., multiplication, addition, etc.). The core 320 is coupled to receive as input a first 64 bits of information on line 321 and a second 64 bits of information on line 322.

In the system of the preferred embodiment, data is supplied to the BIT chips on lines which are 32-bits wide. Therefore, circuitry 313 and 314 (shown within the dashed line boxes) is provided to allow two 32-bit packets of information to be demultiplexed onto line 321 and two 32-bit packets of information to be demultiplexed onto line 322. The circuitry shown in dashed boxes 313 and 314 may be described as a demultiplexor means. It will be understood that while the below description makes specific reference to the circuitry shown in the box labeled 313, the function and circuitry for the second input (shown in box 314) is similar.

The input circuitry includes latch 305 which is controlled to be open when the signal on most significant word enable (MSWEN) line 328 is high. In operation, a first 32 bits of information are provided on line 315 when the signal on line 328 is high and the 32 bits are latched into latch 305. The signal on line 328 is then brought low allowing the first 32 bits to be provided on line 318 and communicated to line 311 as the high order 32 bits. Substantially simultaneously, a second 32 bits of information are provided on line 315 and communicated on line 317 to line 311 and provided on line 311 as the low order 32 bits.

The 64 bits on line 311 are provided to latch/register 323. The circuitry of the BIT arithmetic unit includes line R/L1 329 which allows latch/register 323 (and the corresponding latch/register in circuitry 314) to be configured as either a latch or a register. Latch/register 323 is configured as a latch when the signal on line R/L1 329 is low and is configured as a positive edge-triggered register when the signal on line R/L1 329 is high. In the BIT multiplication unit, latch/register 323 is always configured as a register. In any event, the 64 bits of information which are received at latch/register 323 are provided on line 321 to the core 320.

Finally, an instruction is provided to latch/register 302 on line 301 and is provided from latch/register 302 to the core 320 on line 303.

A 64 bit result produced by the circuitry of core 320 is output on line 338 and is received at latch/register 325 on line 325. Latch/register 325 is clocked by a signal on line CK2 342. In the case of both the BIT multiplication unit and the BIT arithmetic unit latch/register 325 may be configured as either a latch or a register dependent on the signal on line R/L2 344 (latch/register 325 is configured as a latch when R/L2 is low and is configured as positive edge triggered registers when R/L2 is high).

The 64 bits from latch/register 325 are provided on line 331. The high order 32 bits are then communicated on line 333 to multiplexor 339 and the low order 32 bits are communicated to multiplexor 339 on line 332. Multiplexor 339 is controlled by the signal on line MSWSEL 341 selecting the high order 32 bits from multiplexor 339 when the signal is high and provides the high order 32 bits on line 334. The low order 32 bits are selected when the signal on line MSWSEL 341 is low and are provided on line 334.

Although not described in detail above, it should be noted that certain parity bits and other information are also processed by the circuitry of the BIT chips. However, an understanding of such other information is not necessary for an understanding of the present invention.

As one aspect of the present invention, the above-described circuitry has been configured to provide low latency in applications attempting to provide multiplication and addition functions. Use of the above-described circuitry in the system of the present invention will be better understood with reference to FIGS. 5 and 6.

OVERVIEW OF THE VECTOR UNIT OF THE PREFERRED EMBODIMENT

The vector unit of the preferred embodiment is shown in block diagram form with reference to FIG. 5. Vector register file 501 is coupled to communicate a first vector, vector 1 (V1) and a second vector 2 (V2) over bi-directional communications lines 521 with vector data switch 503. In fact, although for purposes of illustration of the present invention, operations on V1 and V2 will be discussed, in the preferred embodiment elements of up to eight vectors per cycle may be communicated over line 521. Vector register file 501 is further coupled to receive control information from vector control unit 502 over lines 523.

Vector data switch 503, in addition to being coupled to communicate vector information with vector register file 501, is coupled to communicate information with vector control unit 502 over lines 524. Lines 524 includes control lines for communication of control information from the vector control unit 502 to the vector data switch 503 and and, further, includes a 32-bit bidirectional data bus. As will be discussed in greater detail below, one of the uses for the 32-bit bidirectional data bus is to store a newly computed mask in the vector register file by communicating the 32-bits of mask information from the temporary mask register 533 through the vector data switch and over lines 521 to the vector register file 501. The 32-bit bidirectional data bus may be further utilized to receive mask information into the vector control unit 502, in this case from the vector register file 501 over lines 521 and through vector data switch 503.

Further, vector data switch 503 is coupled to provide a first vector to arithmetic unit 504 on line 525, a second vector to arithmetic unit 504 on line 526 and a third vector to arithmetic unit 504 on line 527.

Arithmetic unit 504 is coupled to receive control information from vector control unit 502 over line 531 and to provide status information to vector control unit 504 over line 532. The vector control unit 502 comprises a 32-bit temporary register 533. The function of the register 533 will be explained in greater detail below.

Within arithmetic unit 504, multiplication unit 541 is coupled to receive the first vector on line 525 and the second vector on line 526. In the preferred embodiment, multiplication unit 541 comprises a BIT B3110/B2110 floating point multiplication unit. The output of multiplication unit 541 is coupled to provide a result on line 528 to a first input of addition unit 542. Addition unit 542 is further coupled to receive a third vector from vector data switch 503 on line 527. In the preferred embodiment, addition unit 542 comprises a BIT B3120/B2120 floating point arithmetic unit. The result produced by addition unit 542 is provided back to the vector data switch on line 529.

It is worth reviewing the prior art STARDENT 1500 computer system here in a slightly greater detail. In the prior art STARDENT 1500, as well as the system of the present invention, instructions of the following each of the following formats may be encountered:

(1) A = B (i.e., copy vector B to vector A)
(2) A = B alu-op C (i.e., A is computed using the ALU from B & C)
(3) A = B mpy-op C (i.e., A is computed using the multiplication unit from B & C)
(4) A = B mpy-op C alu-op D (i.e., both the ALU and multiplication unit are used)

In the prior art STARDENT 1500, the first three of these instruction formats use a 12 stage operation pipe where the computational stages in the pipe used either the ALU or the multiplication unit (depending on the instruction format). Execution of instructions in the fourth format in the prior art system requires reconfiguring the pipe to become an 18 stage pipe. In this prior art system, the ALU would correspond to one set of stages for instruction formats 1 and 2, above, and a different set of stages for instruction format 4.

As will be seen, in the preferred embodiment of the present invention, the pipe is always a fixed structure where stage 5 is always for the multiplication unit and stage 6 is always for the ALU. All instructions use a unified, fixed structure, pipe. This architecture simplifies the control and data path in the system of the present invention and allows a number of inventive advantages which will be described herein.

DETAILED DESCRIPTION OF THE VECTOR DATA SWITCH AND ARITHMETIC UNIT OF THE PREFERRED EMBODIMENT

Referring now to FIG. 6, a more detailed view of the vector data switch 503 and arithmetic unit 504 of the preferred embodiment is shown. As will be described, certain components of the vector data switch 503 and certain components of the arithmetic unit 504 operate under control of a common clock signal provided on line CLK 702. Other components of the vector data switch 503 and other components of the arithmetic unit 504 operate under control of a second clock signal MSWCLK 701 which is generated from CLK 702.

Looking first at the vector data switch, CLK 702 is provided to control each of a plurality of multiplexors, specifically multiplexors 621 and 622. Each of the plurality of multiplexors is coupled to receive 64 bits of input information and to provide 32 bits of output information in each half of a single clock cycle. For purposes of reference, the 64 bits of input information received by multiplexor 621 will be referred to as the Vector A input; the 64 bits of input information received by multiplexor 622 will be referred to as the Vector B input; and the 64 bits of information received by multiplexor 626 will be referred to as the Vector C input.

The outputs of multiplexors 621–622 are coupled to multiplexors 624–625, respectively. The function of multiplexors 624–625 will be explained in greater detail below. However, for purposes of the present discussion it is sufficient to understand that a first 32 bits of information are provided to input 630 of multiplication unit 541 in the first half of a clock cycle from the output of multiplexor 624 (the high order bits of an element from Vector A are provided assuming the input from multiplexor 621 is selected by multiplexor 624). In a second half of the clock cycle, a second 32 bits of information are provided to multiplication unit 541 (in this case the low order bits of an element from Vector A, again assuming the input from multiplexor 621 is selected by multiplexor 624).

In a similar fashion, the high and low order 32 bits from an element of Vector B are provided as the output of multiplexor 625 to input 631 of multiplier 541. The 64 bits from an element of Vector C are provided as the output of multiplexor 626 to register 610. Inputs 630 and 631 of multiplier 541 correspond to the inputs of circuitry labeled demultiplexor means 313 and 314, respectively, shown in FIG. 3.

It may be useful now to refer to FIG. 7 which is a timing diagram illustrating certain timing features of the system of the present invention. As shown by FIG. 7 and discussed above, the high order bits of an element of Vector A and an element of Vector B are latched into the input latches 634 and 635, respectively, of multiplier 541 at time T1. At time T2, both the high and low order bits are loaded into the multiply input registers 636 and 637 of multiplier 541. (As noted above, in the BIT 3110/2110 floating point multiplication unit latch/register 323 and the corresponding latch/register in demultiplexor 313 are always configured as registers.)

Multiplication unit 541 has a 60 nanosecond core. Therefore, after one period of CLK 701, the result of the specified operation is provided in output register 638 at time T3.

The 64 bit output of register 638 is provided to multiplexor 639 to allow presentation of the high order 32 bits of register 638 in one operation cycle of multiplexor 639 and presentation of the low order 32 bits of register 638 in a second operation cycle as described in connection with FIG. 3. As one aspect of the present invention, multiplexor 639 is operated under control of MSWCLK 701. Multiplexor 639 selects the high order 32 bits of the result and provides these bits to the input latch 650 of addition unit 542 at time T4. Input latch 650 is also controlled by MSWCLK 701. Use of a separate clock signal, delayed from CLK 702, allows for increased operation speed of the circuit of the present invention over a configuration which may utilize a single clock for controlling each of the above described components.

MSWCLOCK 701 is generated from CLK 702 by delay line 641 and inverter 642 and is illustrated in relation to CLK 702 with reference to FIG. 7. The combination of delay line 641 and inverter 642 cause a total of an 18.5 nanosecond delay in MSWCLK 701. As illustrated by FIG. 7, CLK 702 has a period of 62.5 nanoseconds. MSWCLOCK 701 also has a period of 62.5 nanoseconds and the trailing edge of MSWCLOCK 701 is delayed 18.5 nanoseconds from the leading edge of CLK 702.

As another aspect of the present invention, the input information from Vector C is caused to proceed through stages clocked to provide the high order 32 bits of an element of Vector C to latch 651 at the same time as the corresponding input is provided to latch 650, i.e., time T4. Latch 651 is controlled by MSWCLK 701. As can be seen register 610 is controlled by CLK 702; register 612 is provided to receive the output of register 610 and is clocked by MSWCLK 701; multiplexor 643 is provided to receive the output of register 612 and is also controlled by MSWCLK 701.

At time T5, the high and low order bits of the input to arithmetic unit 542 from multiplication unit 542 and the input from Vector C are latched into latch/registers 652 and 653, respectively. It should be noted that addition unit 542 has a 25 nanosecond core (a faster core than multiplication unit 541). Therefore, in the case of arithmetic unit 542 latch/registers 652 and 653 are configured to act as latches and are controlled by MSWCLK 701 allowing presentation of the input information to core of arithmetic unit 542, completion of the operation, and storage of the result in output register 654 all during one period of CLK 702 (i.e., period 3). Latch/register 654 is configured to act as a register and is controlled by CLK 702. The output of register 654 is coupled to multiplexor 655. Multiplexor 655 presents the high order 32 bits of the result when CLK 702 is high and the low order 32 bits when CLK 702 is low.

Utilizing the above-described configuration, minimum latency is achieved for an arithmetic unit such as arithmetic unit 504.

DESCRIPTION OF VECTOR OPERATION INSTRUCTIONS OF THE PREFERRED EMBODIMENT

Certain aspects of the present invention are better understood with an overview of the format of vector operation instructions used both in the prior art STARDENT 1500 Computer and in the preferred embodiment of the present invention. In general, the format of a vector operation instruction in the preferred embodiment comprises a 10 bit operation code ("opcode") 401 followed by a 32 bit operand 402. For compatibility reasons, it was not desirable to change the number of bits used in the opcode 401 or the operand 402 from the number of bits used in corresponding elements of vector operation instructions of the prior art STARDENT 1500 computer.

However, as mentioned previously, as one objective of the present invention it is desired to develop a vector processing computer system which allows operations on an instruction having as many as three input vector operands as opposed to the limitation of the prior art STARDENT 1500 computer to two input vector operands and a constant.

In the system of the preferred embodiment (as well as the prior art STARDENT 1500 computer), addressing of the vector register file (shown as vector register file 202 of FIG. 2 and as vector register file 501 of FIG. 5) requires a ten bit address. Specifically, the vector register file comprises 4 banks of registers—each bank of registers comprising 2048 64-bit registers. Users are assigned context areas within the vector register file and, specifically, a user context area comprises 256 64-bit registers from each of the four banks. Therefore, addressing any specified one of the available 1024 registers in the user context area requires a 10-bit address (i.e., $2^{10}=1024$). Thus, the 32 bit operand descriptor allows for addressing of 3 vector addresses, X, Y and Z (3 * 10 bits=30 bits) and a two bit accumulator (or constant) address.

The three vector addresses are shown in FIG. 4 as operand 1 411, operand 2 412 and operand 3 413. The accumulator is illustrated as accumulator 414. A more detailed description of the format of vector addresses utilized by the system of the present invention is given with reference to co-pending patent application Ser. No. 07/162,738, filed Mar. 1, 1988, titled Vector Register File, and assigned to the assignee of the present invention, the teachings of which are incorporated here by reference.

Using the above described vector operation instruction format, the prior art STARDENT 1500 computer operated on up to two vector operands e.g., Y and Z) plus a constant (e.g. C) and provided a result (e.g., X). For example, the following instruction (in algebraic format) is exemplary of instructions which may be acted on by this prior art system:

$$X = Y^*Z + C$$

Where, the address of X is stored in operand field 411; the address of Y is stored in operand field 412; and the address of Z is stored in operand field 413.

One objective of the present invention is provide increased efficiency in processing of instructions in the computer system of the present invention. To facilitate this, the present invention discloses allowing certain sequences of multiply and ALU instructions to be executed as compound instructions wherein it is not necessary to save intermediate results of the operations. In general, the preferred embodiment implements this feature by allowing certain sequences of a multiply operation followed by an ALU operation to be executed as compound instructions without requirement for storing the intermediate result of the multiply operation. This type of instruction will be termed a two operation instruction. The preferred embodiment of the present invention utilizes the accumulator field 414 in the first instruction of an instruction sequence to indicate a two operation instruction is to take place.

Therefore, as one restriction of the preferred embodiment, two operation instructions may only be executed on instruction sequences wherein the first operation does not normally utilize the accumulator field 414. Several other compatibility restrictions of the system of the preferred embodiment will be discussed below.

Assume an instruction sequence:

$$X = Y \times Z$$

$$X' = Y' + Z'$$

where X, Y, Z, X', Y' and Z' are all vectors.

If the accumulator value (low order two bits of operand 402) is set to $1_{10}$, in the preferred embodiment the output of the first instruction is chained to the Y' input of the second instruction effectively giving the following equation:

$$X' = Y \times Z + Z'$$

If the accumulator value is set to $3_{10}$, the output of the first instruction is chained to the Z' input of the second instruction effectively giving the following equation:

$$X' = Y' + Y \times X$$

If the accumulator value is set to $0_{10}$ the two operation instruction feature is not utilized.

Further, in the preferred embodiment, all two operation instructions are issued as a multiplication unit operation followed by an arithmetic unit operation. As will be seen below, the present invention provides circuitry for efficient processing of the above set-forth instruction set. It is of course obvious to one of ordinary skill in the art that other instructions sets of similar format may also be operated on by the present invention with similar efficiency.

It is worthwhile noting the present invention takes advantage of cooperation between the described circuitry and the design of a complier to achieve operation of a computer system allowing operation of compound instructions as described above. The compiler allows a programmer to develop program code without regard for the particular hardware configuration described herein and allows such code to be compiled to take advantage of the hardware efficiencies of the system of the preferred embodiment.

Advantages of the disclosed arrangement and coupling of the multiplication unit 541 and addition unit 542 in the arithmetic unit 504 and of the circuitry of the vector data switch 503 will be understood with reference to the following example instruction sequence:

$$A = Y^*Z$$

$$X = B + C$$

where A, B, C, X, Y and Z are all vectors.

The preferred embodiment of the present invention sets forth a compatibility restriction wherein A must be equal to X and B must be equal to A, and therefore, B is equal to X. Assuming the described compatibility rules and that the accumulator value is equal to $1_{10}$, the above two instruction sequence may be restated as:

Instruction 1: $X = Y^*Z$

Instruction 2: $X = X + C$ and, therefore, algebraically, may be viewed as the below two operation instruction:

$$X = Y^*Z + C$$

The execution of the above instruction sequence in the computer system of the preferred embodiment will now be described in greater detail with reference to FIG. 6. First, instruction 1 in the sequence is received by operation control circuitry ("opcontrol"). The opcontrol does not execute instruction 1, but rather as a result of detecting a two operation instruction, stalls execution until instruction 2 is received. Then, the two instruction sequence may be operated on by presenting the Y operand to input 630 of multiplier 541 and the Z operand to input 631 of the multiplier 541. The multiplication operation indicated by instruction 1 is then carried out by the multiplier 541 and the result is presented to a first input of the adder 542. The C operand is presented to multiplexor 626 and carried through the vector data switch 503 to be presented to the second input of adder 542.

It is interesting to contrast the above-described steps required to execute these instructions with steps required to execute a similar instruction sequence in the prior art STARDENT 1500 computer. Referring briefly to FIG. 2, vectors Y and Z are received from the vector data switch 203 by multiplication unit 224 on lines 215 and 216, respectively. The result of the multiplication operation, vector X, is supplied back to the vector data switch 203 on line 220. Vector X and vector C are then supplied to addition unit 225 on lines 217 and 218, respectively. The result of the addition operation is then supplied back to the vector data switch on line 221.

It should be noted that in the system of the present invention, programs may be coded without requirement on the part of the programmer to specify the accumulator value (to indicate the desire for a two operation instruction). An optimizing compiler is provided to allow optimization of programs to take advantage of the features of the present invention.

CHAINING OF OPERATIONS IN THE PRESENT INVENTION

In the system of the preferred embodiment the above sequence of instructions may be carried out by chaining instruction 1 with instruction 2 as will be described below. First, referring to FIG. 9, the pipelined architecture of the vector processors of the present invention may be better understood. An operation is initiated by entering the pipeline 901 at a stage 0 910. Stage 0 910 is termed a "pseudo stage" and is only utilized when an instruction is initiated (i.e., it is not utilized for processing of each element of a vector). In stage 0 910, the instruction is set up for further processing.

It will be appreciated that each of stage 0 through stage 8 (910-918) is controlled by CLK signal 702 and each stage operates on an instruction during its first through ninth clock cycles, respectively.

The instruction proceeds to stage 1 911 in which a request is made for resources to read required operands and to stage 2 912 and stage 3 913 in which the operands are read from the vector register file 501. (In the preferred embodiment the vector register file read operation takes two clock cycles.) The multiplier 541 is then loaded with data in stage 4 914, the multiplication operation carried out in stage 5 915, the adder loaded and the ALU operation carried out in stage 6 916 and the data is unloaded from the ALU in stage 7 917—all as described in connection with FIGS. 6 and 7 above. The result of the operation is then written back to the vector register file 501 in stage 8 918.

By detecting relationships between certain operations in Stage 0 910, certain processing efficiencies may be achieved. For example, assume the following instruction sequence:

Instruction 1: $A = B*C$

Instruction 2: $X = Y*A$

Instruction 1 may be received at Stage 0 910 and allowed to proceed along to stage 5 915. Instruction 2 is received at Stage 0 and is allowed to proceed along one clock cycle being instruction 1. However, it will be appreciated that if instruction 2 is allowed to proceed to stage 2 912 an incorrect result may be produced because the result A from instruction 1 has not yet proceeded to completion by being written to the vector register file in stage 8 918. Therefore, the value of A read by instruction 2 would be an erroneous value.

It is possible to stall execution of the processing of the second instruction such that the result of the first instruction is stored in the vector register file prior to allowing instruction 2 to retreive variable A. In such a case, it will be appreciated that, to obtain a correct result, execution of the instruction 2 must be stalled prior to stage 2 912 for 7 clock cycles (i.e., to ensure the result of instruction 1, variable A, has been written to the vector register file prior to reading vector A for use as an operand by instruction 2, instruction 1 must be 7 clock cycles ahead of instruction 2, one clock cycle for each of stage 2 912, stage 3 913, stage 4 914, stage 5 915, stage 6 916, stage 7 917 and stage 8 918).

As one aspect of the present invention, circuitry is provided to allow data to be obtained in stage 8 918 and bypassed to the stage 3 913 read stage. This allows for increased operating speed in the system of the present invention and has been termed "regular chaining" in the system of the present invention.

In a second aspect of the present invention, circuitry is provided to allow an operation in stage 4 914 of the pipeline to utilize data from stage 7 of the pipeline. To facilitate this feature, line 657 is coupled to provide the output data from the adder (unloaded during stage 7) as one input to multiplexors 624-626. This has been termed "short chaining" in the system of the present invention. Selection of a particular input to multiplexors 624-626 is controlled by lines 627-629, respectively.

Prior to describing chaining of operations in the system of the present invention in greater detail, it is worthwhile to describe the demultiplexor 623 of FIG. 6 in greater 10. The circuitry of demultiplexor 623 is shown in FIG. 10. As is now understood, the high order 32 bits of output information from the adder are received on line 657 in the first half of a clock cycle of CLK 702 and the low order 32 bits are received in the second half of a clock cycle of CLK 702. The high order 32 bits are received by register 1011 during the first half of the clock cycle; the low order 32 bits are received on line 1003 during the second half of the clock cycle. The combined 64 bits are clocked into register 1012 and provided to multiplexor 626 on line 1007.

To facilitate an understanding of the general concept of operation chaining in the present invention, the pipeline of the system of the preferred embodiment may be thought of as comprising a first through sixth logical stage (shown as logical stages 921-926) wherein the first logical stage 921 corresponds to stage 1 911, the request for operands; the second logical stage 922 corresponds to stage 2 912 and stage 3 913, reading the vector register file; the third logical stage 923 corresponds to stage 4 914, loading the multiply unit (it will be recalled that during this stage three operands may be provided in the system of the present invention, the first and second operands being provided to the multiplication unit and the third being clocked through registers to be provided to the adder; thus, this step may be thought of as loading the arithmetic unit as opposed to simply loading the multiplication unit); a fourth logical stage 924 corresponds to stage 5 915, carrying out the multiplication operation and stage 6 916, carrying out the addition operation (therefore, the fourth logical stage may be thought of as the stage of executing the instruction); a fifth logical stage 925 corresponding to stage 7 917, unloading the ALU; and a sixth logical stage 926 corresponding to stage 8 918, writing to the vector register. Viewing the pipeline as a series of logical stages facilitates an understanding of the scope of this aspect of the present invention. For example, although in the preferred embodiment, the fourth logical stage 924 comprises two separate stages (i.e., stage 5 915 and stage 6 916), the teachings of the present invention are equally applicable to a system which combines the multiplication and addition stages into a single stage.

If a data conflict is detected between an operand in the third logical stage 923 or the fourth logical stage 924 and an operand in the first logical stage 921 of the pipeline 901, the conflicting operand may be considered for short chaining. Viewed as a boolean expression, an operand in the first logical stage 921 is a candidate for short chaining where:

((logical stage 3 operand D conflicts with logical stage 1 operand A, B or C) and (logical stage 2 operand D does not conflict with logical stage 1 operand A, B or C)

or ((logical stage 4 operand D conflicts with logical stage 1 operand A, B or C) and (logical stage 3 operand D does not conflict with logical stage 1 operand A, B or C) and (logical stage 2 operand D does not conflict with logical stage 1 operand A, B or C));

where an instruction takes the general form:

D = A operator B operator C, and
A, B, C, and D are all operands.

In other words, if the result of an instruction in logical stage 1 depends on the result of an instruction in logical stage 3 and the result of the instruction in logical stage 1 does not depend on the result of an instruction in logical stage 2, or the result of an instruction in logical stage 1 depends on the result of an instruction in logical stage 4 and the result of the instruction in logical stage 1 does not depend on the result of an instruction in logical stages 2 or 3, potential for short chaining exists.

In the preferred embodiment, other factors are considered in determining whether the short chaining feature will be utilized. For example, under certain circumstances an instruction may take more than one clock cycle in the multiplication unit. If the instruction in stage 2 or 3 is expected to take more than one clock cycle in the multiplication unit, short chaining is not utilized. Further, in the case of certain instructions in the present invention, whether the result D is stored in the vector register file is conditional and depends on the value of a flag in a mask register. In such cases, short chaining may not be used.

In any event, if it has been determined that short chaining is to be utilized for operand A, for example, control line 627 is controlled to provide the result on line 657 to either input 630 when operands for instruction 2 are loaded into the multiply unit.

Essentially, in terms of the present example of instruction 1 and instruction 2 recited above, what is provided is circuitry which allows detection of the situation in which the result of a first instruction currently in the pipeline is used as an operand of a second instruction entering the pipeline; circuitry for stalling execution of the second instruction for a predetermined number of clock cycles; and circuitry for providing the result A of the first instruction as an operand A of the second instruction without needing to store the result A during the sixth logical stage 926 for instruction 1 and to subsequently read the stored value of A in the second logical stage 922 for instruction 2.

PRESERVATION OF SIGNS IN VECTOR OPERATIONS

Referring now to FIG. 8, circuitry for optionally preserving signs during calculations in the arithmetic unit is shown in block diagram form. It should be understood that in certain comparison operations of the system of the preferred embodiment, the absolute values of the operands are compared. In executing such comparison operations sign information is not carried in the arithmetic unit 504. However, in certain applications it is desired to retain the sign of the result of the comparison operation. For example, consider the following operation:

$X = Y$ if (absolute value $Y$) > (absolute value $Z$)

and $X = Z$ if (absolute value $Y$) ≯ (absolute value $Z$)

In this case, it is desired to compare the absolute value of Y to the absolute value of Z. If the absolute value of Y is greater than the absolute value of Z, then the value of Y is stored as X. If the absolute value of Y is not greater than the absolute value of Z, the value of Z is stored as X.

In the present invention the circuitry shown in FIG. 8 is utilized to provide the sing of the value Y in such an operation. A first plurality of stages 801 (or single bit registers) corresponding to each of stages 3–7 of the pipeline of the preferred embodiment are provided for preserving the sign of a first operand (e.g., operand Y). A second plurality of stages 802, again corresponding to each of stages 3–7 of the pipeline, are provided for preserving the sign of a second operand (e.g., operand Z).

When the operands are retrieved from the vector register file at stage 3 913, the 31st and 63rd bits of the Y operand are presented to multiplexor 812. The 31st and 63rd bits of the Z operand are presented to multiplexor 813. Multiplexors 812 and 813 operate under control of a signal indicating whether the present operation is a single word or double word operation. If the operation is a single word operation, the sign of operand Y is contained as the 31st bit of the operand Y and the sign of operand Z is contained as the 31st bit of operand Z. If the operation is a double word operation, the sign of operand Y is contained as the 63rd bit of the operand Y and the sign of operand Z is contained as the 63rd bit of operand Z. Therefore, in the case of a single word operation, multiplexors 812 and 813 are controlled to select their respective 31st bit inputs and in the case of a double word operation multiplexors 812 and 813 are controlled to select their respective 63rd bit inputs.

The selected inputs are passed from stage to stage in the plurality of stages 801 and 802 under control of common signals controlling passing of the instruction from stage to stage in the pipeline. When the instruction reaches stage 7 917 (unloading the result from the ALU), the sign bits from stages 801 and 802 are presented as inputs to multiplexor 831. Multiplexor 831 operates under the control of a signal 832 from the vector control unit 502 and provides the sign 833 of the operand Y or Z, depending on which operand was selected as having the greater absolute value. The value of Y or Z, including sign information, may then be stored as the result X in stage 8 918 of the pipeline.

The circuitry utilized for preservation of signs during absolute value comparison operations in the system of the preferred embodiment may be understood in greater detail with reference to FIGS. 12 and 13. FIG. 12 illustrates a more detailed block diagram of the BIT chips utilized by the preferred embodiment and is useful for detailing certain input and output signals of the BIT chip which are utilized by the preservation of sign circuitry of the present invention. The block diagram illustrated by FIG. 12 is further described with reference to the BIT Preliminary B3110/B3120 B2110/B2120 Floating Point Chip Set Specification, pages 1-4, available from Bipolar Integrated Technology, Inc. which is incorporated here by reference. FIG. 13 illustrates a more detailed block diagram of circuitry utilized for preservation of sign information in the system of the preferred embodiment.

Certain portions of the circuitry of FIG. 13 have been explained with reference to FIG. 8. FIG. 13 further illustrates circuitry (shown in dashed box 1301) for replacing the sign bit of the output from the adder, or ALU, or the arithmetic unit on line 1302 with the sign information from the preservation of sign circuitry. The result of an absolute value comparison operation with the sign information restored may then be stored in the vector register file or otherwise utilized by the system of the present invention.

It should be noted that signal MPYEN of FIG. 13 corresponds to a signal generated to control XEN, YEN and ZEN signals of the multiply unit; ALUZEN corresponds to a signal generated to control ZEN of the adder; ALUYSEL corresponds to a signal generated to control YSEL of the adder; ALUCARRY corresponds to the CRY flag (one of the FLAGS) from the adder; ALUOUT corresponds to the T output of the adder; APIPEENREG corresponds to a signal for controlling the A pipe in the system of the present invention; and CPIPEENREG corresponds to a signal for controlling the C pipe in the system of the present invention.

MASKED REGISTER IN THE VECTOR REGISTER FILE

As discussed above, in the prior art STARDENT 1500 computer the vector control unit comprises a 256 bit register utilized as a mask register when performing masked calculation on vectors. This presents several disadvantages and shortcomings which are overcome by the present invention. These shortcomings and disadvantages were discussed in some detail above.

Essentially, it is desired to provide capability for storage of multiple masks. Providing such capability by increasing the number of mask registers on the vector control unit, although possible, does not lead to an optimal solution—additional masks would consume additional real estate on the vector control unit and, in any event, there would always be some relatively small number of registers available for storage of masks. Further, such a solution would not allow direct operation on masks without additional added circuitry such as an ALU in the vector control unit. Further, the circuitry and method disclosed by the present invention provides for an advantageous reduction in complication of synchronization circuitry required when operating on masks.

Therefore, as another aspect of the present invention, masks are stored in the vector register file in the present invention.

Further explanation of the storage of masks in the vector register file (as well as other aspects of the present invention which deal with the vector register file) will be enhanced with more a more detailed understanding of the vector register file of the present invention. Essentially, the vector register file of the present invention is comprised of a plurality of banks of memory cells. A particular vector within the vector register file may be addressed by specifying a bank and an offset within the bank. The vector register file of the present invention offers a relatively large amount of memory space in which to store vectors; therefore, use of the vector register file for storing masks is not viewed as a limitation on the resources of the system. It should be noted that other known vector processing systems have limited space in their vector register files. Therefore, the methods of the present invention may offer shortcomings (such as use of valuable vector register file space) if applied in such systems.

Further description of the structure and of addressing the vector register file is available with reference to co-pending application Ser. No. 162,738, filed Mar. 1, 1988, titled Vector Register File and assigned to the assignee of the present invention. This application is incorporated herein by reference.

In the present invention, a masked operation may take the general format:

mask $X = Y$ comparison $Z$ where:
mask X is a value representative of an address in the vector register file and in the preferred system specifies a bank and an offset addressing of a 32 bit vector register space; and Y comparison Z is an boolean operation in which values of vector Y are compared with corresponding values of vector Z; if the comparison results in boolean true, a one bit is stored in the corresponding bit of a mask register identified by mask X; if the comparison results in a boolean false, a zero bit is stored in the corresponding bit of a mask register identified by mask X.

Instructions in the present invention which operate on masks include as an operand information identifying a bank and an offset to specify the area in the vector register file in which the desired mask is stored. Such instructions are of the general format:

$A = Y$ operation $C$ use mask true and $A = Y$ operation $C$ use mask false where the value of an element in vector A is updated with the value of operation "Y operation C" if, and only if, the corresponding value in the mask register is true in the case of the first instruction and if, and only if, the corresponding value in the mask register is false in the case of the second instruction. Otherwise, the value of the element of vector A remains unaffected by the operation.

Referring briefly now to FIG. 5, to accomplish storage of the masks in the vector register file a 32-bit temporary resister 533 is provided in the vector control unit 502. Status information including the result of mask comparison operations is communicated to vector control unit 502 on status line 532. In the preferred embodiment, the adder 542 is coupled to communicate the results of comparison operations over status line 532. For example, if an operation such as:

$$\text{mask } X = Y > Z$$

is presented to the arithmetic unit 504, each element of Y is compared to a corresponding element of Z. If the element of Y is greater than the element of Z, a "1" bit (representing true) is communicated on status line 532 to the 32-bit temporary register 533 and is placed in a position corresponding to the current element of the Y vector. Similarly, a "0" bits (representing false) is communicated and stored in the register 533 if the element of Y is not greater than the element of Z.

Upon completion of the comparison operation, the contents of register 533 are communicated over lines 524 through the vector data switch 503 and over lines 521 to the address specified by the operand X in the vector register file 501. Note that line 524 is a 32-bit wide line, allowing communication of all 32 bits in register 533 in a single cycle.

In a corollary manner, if an instruction such as:

$$A = Y + Z \text{ use mask true}$$

or $$A = Y + Z \text{ use mask false}$$

is presented for execution, the mask specified by the operand mask X is loaded from the vector register file 501 over lines 521 through the vector data switch 503 and over lines 524 into a 32-bit register in the vector control unit 502. Based on the value of bits in loaded in this register, vector control unit 502 controls execution of the instruction such that elements of vector A are updated with the result of the operation Y+Z if, and only if, the corresponding bit in mask X is set to 1 (representing true).

In the preferred embodiment, the vector control unit 502 comprises 4 32-bit registers. This is illustrated with reference to FIG. 11. A first and second 32-bit registers 1101 and 1102 are provided and utilized by the load pipes of the system of the present invention. A third 32-bit register 1103 is provided and used by the store pipe and a fourth 32-bit register 1104 is provided and utilized by the operation pipe.

Further, the vector control unit 502 comprises a mask offset register 1108 for storing the offset address of a mask (e.g. mask X). The offset address of X (in the above-referenced equation "mask X=Y>Z") is stored in the mask offset register 1108 the the time the equation is executed. When a subsequent operation, such as the operation indicated by the equation "A=Y+Z mask true" is executed, the mask offset register 1108 is utilized to provide offset address information to the vector register file 501 for allowing the appropriate mask (i.e., the mask referenced by the offset address in the mask offset register 1108) to be read from the vector register file 501. In addition to be updated responsive to performing an operation to compute mask values, the mask offset register 1108 is also directly writable allowing retrieval of masks from any desired offset.

Of course, in alternative embodiments of the present invention not utilizing the preferred structure comprising a plurality of banks, alternative information may be provided to allow identification of the location of the desired mask.

In the preferred embodiment, the mask is stored in a maximum of 32 bits. Therefore, masked operations utilizing the described circuitry may only take place on vectors of lenght 32 or less. In alternative embodiments, an alternative number of bits may be used to store mask information allowing masked operations on vectors of a greater length. It is worth noting that in the system of the preferred embodiment, a compiler is provided which ensures vectors of length greater than 32 are not utilized. If a vector of length greater than 32 is specified in a source program, the compiler attends to managing the larger vector as a plurality of vectors all of length 32 or less.

By utilizing the described system for storing mask information in the vector register file, instruction sequences operating in the computer system of the present invention may utilize any number (up to the physical limits of the vector register file of the present invention) of mask registers by identifying the mask register location within the vector register file. Further, storage of mask information in the vector register file may be accomplished without additional added memory or circuitry.

Thus, a vector processing computer system having an improved vector unit has been described.

What is claimed is:

1. A computer having a multiplication unit, an addition unit and a clock generation means for generating a second clock signal from a first clock signal, said first clock signal leading said second clock signal; said multiplication unit comprising:
   a first multiplication input controlled by said first clock signal for receiving a first input;
   a second multiplication input controlled by said first clock signal for receiving a second input; and
   a multiplication output controlled by said second clock signal for providing a first output; said additional unit comprising:
   a first addition input controlled by said second clock signal for receiving said first output;
   a second addition input controlled by said second clock signal for receiving a third input; and
   an addition output controlled by said first clock signal for providing a second output.

2. The computer as recited by claim 1 wherein said second clock signal is generated by inverting and delaying said first clock signal.

3. The computer as recited by claim 1 wherein said clock generation means comprises a delay line and an inverter.

4. The computer as recited by claim 1 wherein said first multiplication input comprises a demultiplexing means for providing input of 64 bits.

5. The computer as recited by claim 4 wherein said multiplication output comprises a multiplexing means for providing output of 32 bits.

6. A computer comprising:
(1) processing means for processing information;
(2) storage means for storing information;
(3) input/output means for communicating information with at least one peripheral device;
(4) communication means for communicating information between said processing means, said storage means and said input/output means;
(5) first clock generation means for generating a first clock signal; and
(6) second clock generation means for generating a second clock signal, said second clock signal trailing said first clock signal and having a predetermined relationship with said first clock signal;
wherein said processing means includes a multiplier and an adder, said multiplier comprising:
a first multiplication input controlled by said first clock signal for receiving a first input;
a second multiplication input controlled by said first clock signal for receiving a second input; and
a multiplication output controlled by said second clock signal for providing a first output; said adder comprising:
a first addition input controlled by said second clock signal;
a second addition input controlled by said second clock signal for receiving a third input; and
an addition output controlled by said first clock signal for providing a second output.

7. The computer recited by claim 6 wherein said first multiplication input is coupled to receive a first vector.

8. The computer as recited by claim 7 wherein said second multiplication input is coupled to receive a second vector.

9. The computer as recited by claim 8 wherein said second addition input is coupled to receive a third vector.

10. In a computer having a multiplier and an adder, said multiplier having a first multiplication input, a second multiplication input and a multiplication output, said adder having a first adder input, a second adder input and an adder output, said computer further having a first clock generation means for generating a first clock and a second clock generation means for generation means for generating a first clock and a second clock generation means for generating a second clock, said second clock having a fixed relationship with said first clock, a method comprising:
(a) loading first data in said first multiplication input during a first cycle of said first clock and loading second data in said second multiplication input during said first cycle of said first clock;
(b) said multiplier performing an operation during a second cycle of said first clock;
(c) loading third data in said first adder input during a third cycle of said first clock, loading fourth data in said second adder input during said third cycle of said first clock; said adder performing an operation during said third cycle of said first clock; said loading of said third data and said fourth data operating under control of said second clock; and
(d) said adder providing an output during a fourth cycle of said first clock.

11. The method as recited by claim 10 wherein a first portion of said first data is loaded during a first half of said first cycle.

12. The method as recited by claim 11 wherein a second portion of said first data is loaded during a second half of said first cycle.

13. The method as recited by claim 12 wherein a first portion of said third data is loaded during a first half of a cycle of said second clock.

14. The method as recited by claim 13 wherein a second portion of said third data is loaded during a second half of said cycle of said second clock.

15. The method as recited by claim 14 wherein said second clock is generated by delaying and inverting said first clock.

16. In a computer system having:
(1) a multiplier for performing an operation on at least a first operand and a second operand, said multiplier having a core processing speed of greater than a first pre-determined speed;
(2) an adder for performing an operation on at least a third operand and a fourth operand, said adder having a core processing speed of less than said first pre-determined speed;
(3) a first clock generation means for generating a first clock, said first clock having a period of a first pre-determined time; a method comprising the steps of:
(a) performing a first operation on said first operand and said second operand in said multiplier in a first clock cycle generated by said first clock;
(b) loading said adder with a first result of said first operation and said fourth operand and performing a second operation in a second clock cycle generated by said first clock; and
(c) unloading a second result from said adder in a third clock cycle, said third clock cycle occurring subsequent to said second clock cycle.

17. The method as recited by claim 16 wherein said first pre-determined speed is approximately 60 nanoseconds.

18. The method as recited by claim 17 wherein said core processing speed of said adder is approximately 25 nanoseconds.

19. The method as recited by claim 18 wherein said first pre-determined time is approximately 62.5 nanoseconds.

20. The method as recited by claim 16 further comprising the step of loading said first operand and said second operand in said multiplier in a fourth clock cycle, said fourth clock cycle preceding said first clock cycle.

21. In a computer system having:
(1) a multiplier for performing an operation on at least a first operand and a second operand, said multiplier having a core processing speed of greater than a first pre-determined speed;
(2) an adder for performing an operation on at least a third operand and a fourth operand, said adder having a core processing speed of less than said first pre-determined speed;
(3) a first clock generation means for generating a first clock, said first clock having a period of a first pre-determined time; a method comprising the steps of;
(a) performing a first operation on said first operand and said second operand in said multiplier in a first clock cycle generated by said first clock;
(b) loading said adder with a first result of said first operation and said fourth operand and performing a second operation in a second clock cycle generated by a second clock signal.

22. The method as recited by claim 21 wherein said second clock signal is generated having a fixed relationship with said first clock signal.

23. The method as recited by claim 22 wherein said second clock signal is generated by delaying and inverting said first clock signal.

* * * * *